(12) United States Patent
Kang et al.

(10) Patent No.: US 8,281,329 B2
(45) Date of Patent: Oct. 2, 2012

(54) DISK RETRIEVE AND RELEASE DEVICE AND AUTOMATION DISK BURNING SYSTEM

(75) Inventors: Ho-Cheng Kang, ShinJuang (TW); Sung-Hsuan Wang, ShinJuang (TW)

(73) Assignee: Bluhen Tech Enterprise Ltd. (TW)

( * ) Notice: Subject to any disclaimer, the term of this patent is extended or adjusted under 35 U.S.C. 154(b) by 103 days.

(21) Appl. No.: 12/981,493

(22) Filed: Dec. 30, 2010

(65) Prior Publication Data
US 2012/0174130 A1 Jul. 5, 2012

(51) Int. Cl.
*G11B 17/03* (2006.01)
*B31F 1/07* (2006.01)
(52) U.S. Cl. .......................... 720/632; 101/4
(58) Field of Classification Search .................. 720/615, 720/632–635; 369/30.61, 30.34, 30.4–30.99; 101/4, 35, 40–44; 347/2–4, 104, 108; 414/797.4–798.1, 411; 250/201.5
See application file for complete search history.

(56) References Cited

U.S. PATENT DOCUMENTS

| | | | |
|---|---|---|---|
| 6,490,232 B2 * | 12/2002 | Sato | 369/30.34 |
| 2009/0025020 A1 * | 1/2009 | Kahle | 720/615 |

* cited by examiner

*Primary Examiner* — Craig A. Renner
*Assistant Examiner* — Gustavo Polo

(57) ABSTRACT

The present invention relates to an improve disk retrieving and releasing device and an automation disk burning system, wherein the improve disk retrieving and releasing device is opposite to an optical disk driver of a host and disposed on the host, such that the host and the improve disk retrieving and releasing device constitute the automation disk burning system. The improve disk retrieving and releasing device is adapted for automatically retrieving a disk from a disk tray when disk tray withdraws from the optical disk driver, and releasing and putting the disk into a disk collecting bucket when the disk tray gets back into the optical disk driver. The improved disk retrieving and releasing device comprises: a frame member and two clamping mechanisms, wherein the clamping mechanism comprises: a support member, a clamping member, and an interlocked rod.

18 Claims, 16 Drawing Sheets

DISK RETRIEVE AND RELEASE DEVICE AND AUTOMATION DISK BURNING SYSTEM

BACKGROUND OF THE INVENTION

1. Technical Field

The present invention relates to a disk retrieving and releasing device and an automation disk burning system, and more particularly, to an improved disk retrieving and releasing device and an automation disk burning system, in which at least two clamping mechanisms with low manufacturing costs and simple mechanical design are used to clip and release a disk.

2. Description of Related Art

Generally, an automation disk burning system includes a robot arm used to retrieve a disk from a disk tray when the disk burning process is completed and the disk tray exits out of an optical disk driver; moreover, the robot arm is further used to automatically put the disk into a pudding barrel or any other disk storing devices.

Referring to FIG. 1, a stereo view of an optical disk driver with a disk retrieving mechanism is illustrated. As shown in FIG. 1, the disk retrieving mechanism 2' is disposed on an outer side of the optical disk driver 1' and formed an automation disk burning system with the optical disk driver 1'. The disk retrieving mechanism 2' includes: a driving mechanism 21', a moving arm 22' and a retrieving and releasing member 23'. For the optical disk driver 1' with the disk retrieving mechanism 2', when the optical disk driver 1' starts to execute a disk burning process, the moving arm 22' is driven by the driving mechanism 21'; furthermore, the moving arm 22' moves a disk 6' from an unprocessed disk storing district 3' onto a disk tray 11' of the optical disk driver 1' through the retrieving and releasing member 23'; and then, after the disk burning process is completed, the moving arm 22' is driven by the driving mechanism 21' and moves the disk 6' from the disk tray 11' into a processed disk storing district 5' via the retrieving and releasing member 23'.

Although the above-mentioned optical disk driver 1' with the disk retrieving mechanism 2' is capable of automatically and quickly carrying out the disk burning process by utilizing the disk retrieving mechanism 2' to automatically retrieve and release the disk 6', the optical disk driver 1' with the disk retrieving mechanism 2' (i.e., the automation disk burning system) still has shortcomings and drawbacks as follows:

The disk retrieving mechanism 2' is a kind of the robot arm, so that, it has high equipment and maintenance costs not an individual enterprise or a small company can afford.

The overall structure of the disk retrieving mechanism 2' is huge, that causes the single optical disk driver 1' can merely carry one disk retrieving mechanism 2'; so that, for a computer host having multi optical disk drivers 1', it can not dispose multi disk retrieving mechanisms 2' in each of optical disk drivers 1'.

Accordingly, in view of the conventional optical disk driver with the disk retrieving mechanism still has shortcomings and drawbacks, the inventor(s) of the present application have made great efforts to make inventive research thereon and eventually provided an improved disk retrieving and releasing device and an automation disk burning system.

SUMMARY OF THE INVENTION

The primary objective of the present invention is to provide an improved disk retrieving and releasing device with simple mechanical designs and low manufacturing costs, that can be easily equipped on an optical disk driver for retrieving a disk when a disk tray exits out of the optical disk driver, and releasing the disk after the disk tray gets back into the optical disk driver, automatically.

The another objective of the present invention is to provide an automation disk burning system having at least one optical disk driver and at least one improved disk retrieving and releasing device, in which the improved disk retrieving and releasing device is able to automatically clip a disk when the optical disk driver completes a disk burning process and a disk tray exits out of the optical disk driver, moreover, after the disk tray returns into the optical disk driver, the improved disk retrieving and releasing device releases the disk for making the disk fall into a processed disk storing district, so as to finish an automation disk burning process.

Accordingly, to achieve the abovementioned primary objective, the inventor(s) propose an improved disk retrieving and releasing device, capable of being disposed on an optical disk driver for automatically clipping a disk when a disk tray exits out of the optical disk driver, and able to automatically release the disk into a processed disk storing district after the disk tray gets back into the optical disk driver, the improved disk retrieving and releasing device comprises: a frame body, and at least two clamping mechanisms.

The frame body has an opening with a certain size allowing the disk to pass through, and the clamping mechanisms are oppositely disposed in the two sides of the frame body and connected to an external interlocked device, wherein the clamping mechanisms are able to clip the disk through the drive of the interlocked device, each clamping mechanism comprises: a supporting member, having a top portion and a bottom portion with an accommodation space; a clamping member, which is disposed in the accommodation space and has a clamping portion, an extension portion and an interlocked shaft; and an interlocked rod, partially inserted into the accommodation space, the interlocked rod has at least one fastening member adapted for clasping the clamping member so as to drive the clamping member.

In the improved disk retrieving and releasing device, the interlocked rods are connected to the interlocked device, with the intention that, the interlocked device is capable of propelling the interlocked rods to the interlocked shafts, then the clamping members gradually and simultaneously exit out of the accommodation spaces and to clip the disk, and consequently, the clamping members are gradually moved toward the top portions and raise the disk by way of continuously driving the interlocked shafts through the interlocked rods propelled by the interlocked device.

Moreover, to achieve the another objective of the present invention, the inventor(s) propose an automation disk burning system, comprising: a host, an unprocessed disk storing district, an automation disk feeding device, and at least one improved disk retrieving and releasing device, wherein the host has at least one optical disk driver.

The unprocessed disk storing district is disposed on the host for storing a plurality of un-burned disks, and the automation disk feeding device is disposed on the host and has a disk-feeding portion and a disk-exiting portion. The disk-feeding portion is connected to the unprocessed disk storing district, thereof, through the disk-exiting portion, the disk-feeding portion is able to automatically feed a disk in the unprocessed disk storing district onto a disk tray of the optical disk driver.

The improved disk retrieving and releasing device is opposite to the optical disk driver and disposed on a front panel of the host, and is used to automatically clip the disk when the disk tray exits out of the optical disk driver, the improved disk retrieving and releasing device comprises: a frame body, having an opening with a certain size allowing the disk to pass through; and at least two clamping mechanisms, which are oppositely disposed on the two sides of the frame body and connected to an external interlocked device, the clamping mechanisms are able to clip the disk through the drive of the interlocked device, each clamping mechanism comprises: a clamping member having a clamping portion adapted for clipping the disk; and a supporting member connected to the clamping member.

wherein the supporting members are connected to the interlocked device, with the intention that, the interlocked device is capable of propelling the supporting members to move, so as to make the clamping member to clip the disk; moreover, the interlocked device can further propel the supporting members, such that the disk is raised by the clamping members and leaves the surface of the disk tray; furthermore, after the disk tray returns into the optical disk driver, the interlocked device reversely operates and drives the supporting members, such that the clamping members are getting down and release the disk, and then the disk falls into a processed disk storing district.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe an improved disk retrieving and releasing device and an automation disk burning system according to the present invention, embodiments of the present invention will be described in detail with reference to the attached drawings hereinafter.

Figure 1:
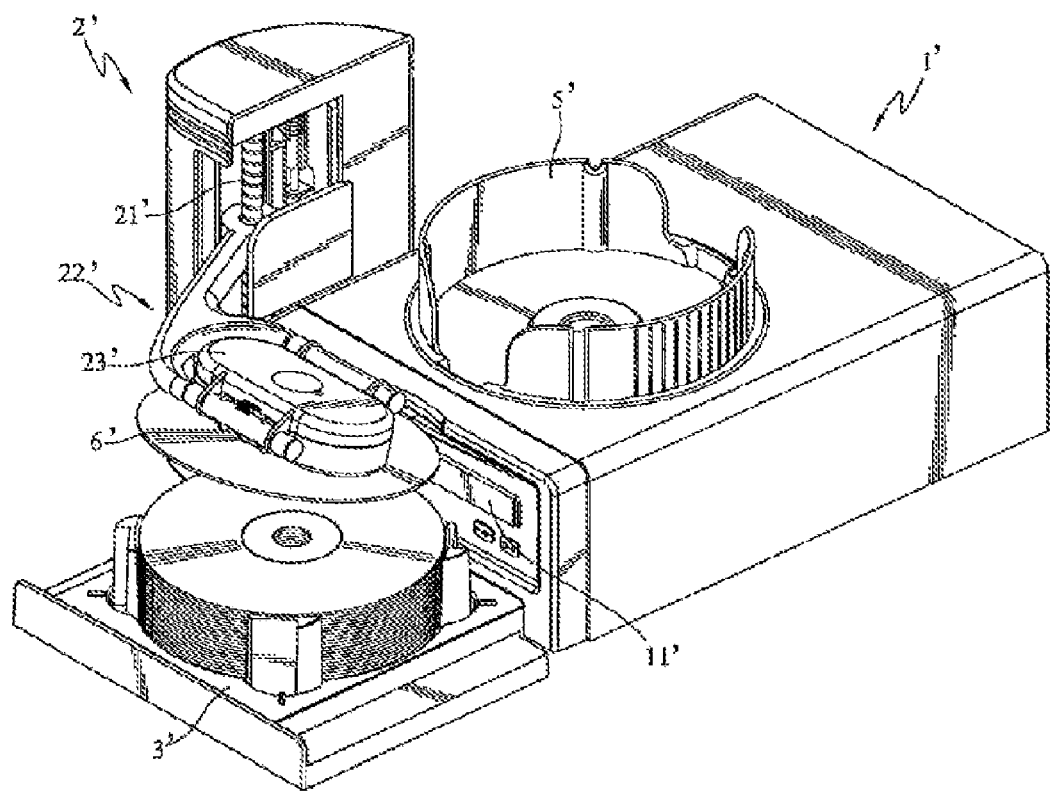
FIG. 1 is a stereo view of an optical disk driver with a disk retrieving mechanism.
Figure 2A:
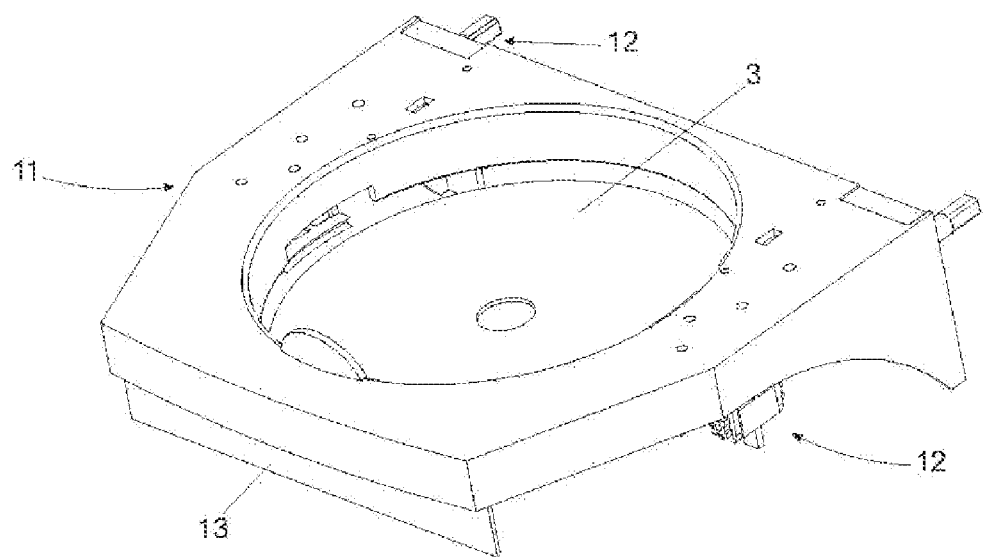
FIGS. 2A and 2B are the stereo diagrams of an improved disk retrieving and releasing device according to the present invention.
Figure 2B:
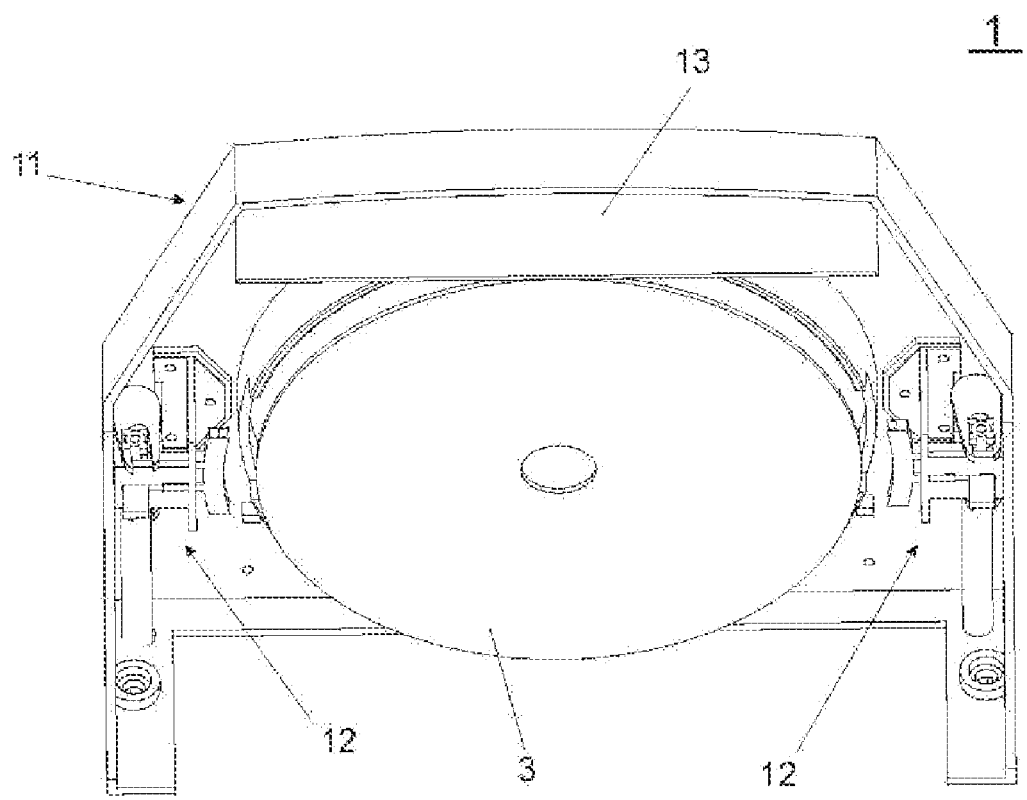

With reference to FIGS. 2A and 2B, which illustrate stereo diagrams of an improved disk retrieving and releasing device according to the present invention. As shown in FIGS. 2A and 2B, the improved disk retrieving and releasing device 1 is capable of being disposed on an optical disk driver for automatically clipping a disk 3 when a disk tray exits out of the optical disk driver, and is able to automatically release the disk 3 into a processed disk storing district after the disk tray gets back into the optical disk driver. The improved disk retrieving and releasing device 1 includes: a frame body 11; two clamping mechanisms 12, oppositely disposed in two sides of the frame body 11 and connected to an external interlocked device, the clamping mechanisms 12 are able to clip the disk 3 through the drive of the interlocked device; and a blocking board 13, which is opposite to the disk tray of the optical driver and disposed on one side of the frame body 11, the blocking board 13 is used for preventing the disk tray from falling off when the disk tray exits out of the optical disk driver.

Figure 3:
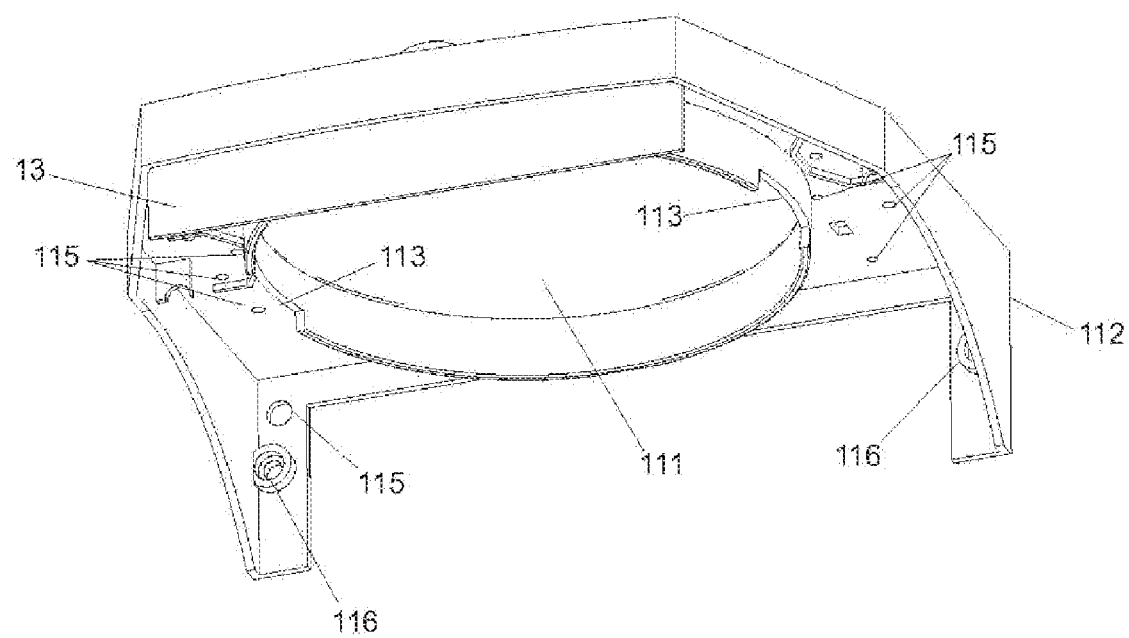
FIG. 3 is the stereo view of a frame body of the improved disk retrieving and releasing device according to the present invention.

Referring to FIG. 3, which illustrates the stereo view of the frame body of the improved disk retrieving and releasing device according to the present invention. As shown in FIG. 3, the frame body 11 includes an opening 111, two through holes 112, two long recesses 113, a plurality of first connecting holes 115, and two threaded holes 116, wherein the size of the opening 111 allows the disk 3 to pass through. The two through holes 112 are formed in the two sides of the bottom of the frame body 11, the two long recesses 113 are formed in two sides of the opening 111, the plurality of first connecting holes 115 are formed on the two sides of the frame body 11, and the two threaded holes 116 are opposite to the two through holes 112 and formed in the two sides of the bottom of the frame body 11, wherein the frame body 11 can be attached to the optical disk driver through the two threaded holes 116.

Figure 4A:
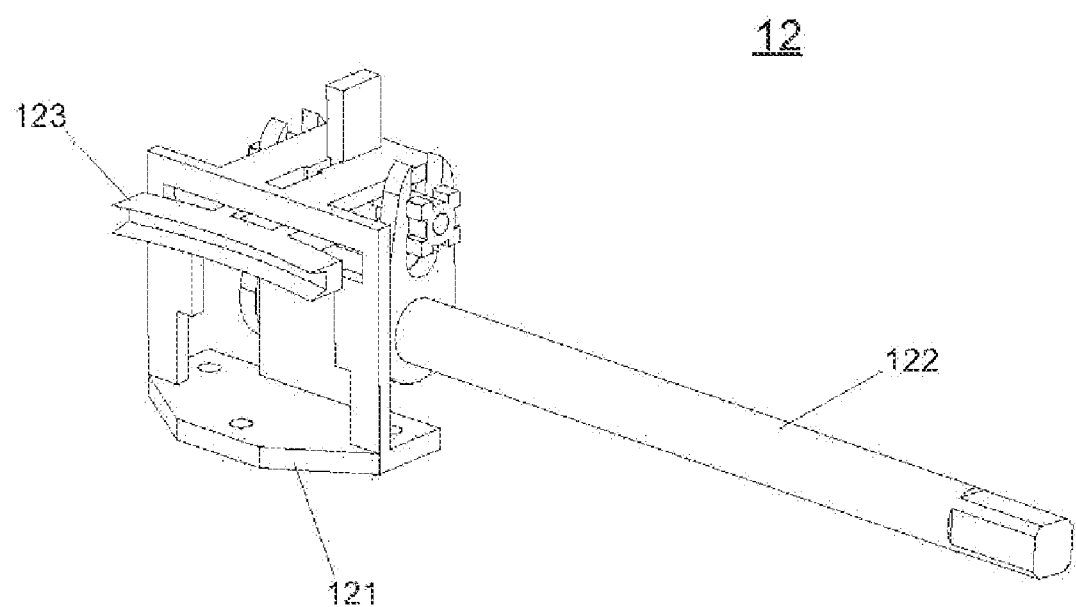
FIG. 4A is the stereo diagrams of a clamping mechanism of the improved disk retrieving and releasing device according to the present invention.
Figure 4B:
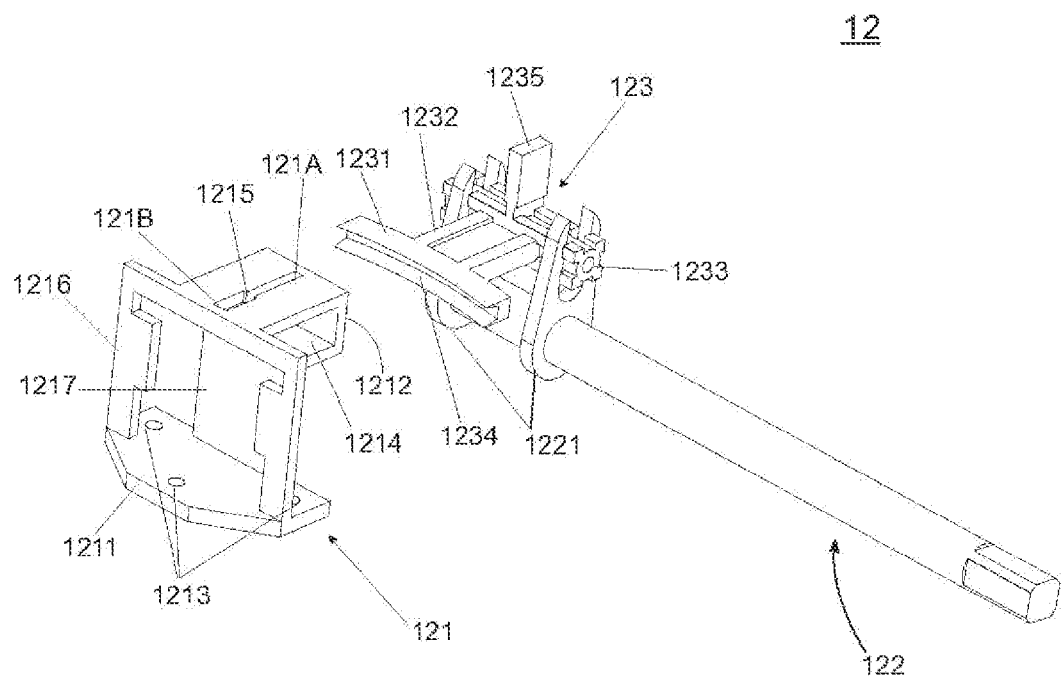
FIG. 4B is a partial exploded view of a clamping mechanism of the improved disk retrieving and releasing device according to the present invention

Referring to FIGS. 2A and 2B again, and simultaneously referring to FIGS. 4A and 4B, which illustrate the stereo view and a partial exploded view of the clamping mechanism of the improved disk retrieving and releasing device according to the present invention. The clamping mechanism 12 includes: a supporting member 121, a clamping member 123 and an interlocked rod 122, wherein the supporting member 121 has a top portion 1211, a bottom portion 1212 and two connecting portions 1214; moreover, a plurality of second connecting holes 1213 are disposed on the top portion 1211 corresponding to plurality of first connecting holes 115, such that the supporting member 121 can be secured to the frame body 11 through the second connecting holes 1213 and the first connecting holes 115. The bottom portion 1212 has an accommodation space 1214 and a long aperture 1215. The two connecting portions 1214 are connected to the top portion 1211 and the bottom portion 1212, so as to form a separation distance between the top portion 1211 and the bottom portion 1212. In the embodiment of the improved disk retrieving and releasing device 1, the two connecting portions 1214 are a connecting frame 1216 and a connecting short board 1217.

Referring to FIGS. 2A, 2B, 4A, and 4B again, the clamping member 123 is disposed in the accommodation space 1214 and includes a clamping portion 1231, an extension portion 1232, an interlocked shaft 1233, and a positioning block 1235, wherein the clamping portion 1231 is the front end of the clamping member 123 and has a clamping groove 1234 with a certain groove width. In the embodiment of the improved disk retrieving and releasing device 1, the two clamping members 123 clip the disk 3 by embedding the disk 3 into the two clamping grooves 1234 thereof. Besides, the extension portion 1232 is the trunk of the clamping member 123, the interlocked shaft 1233 is formed on the extension portion 1232, and the positioning block 1235 is perpendicularly disposed on the interlocked shaft 1233 and passes through the long aperture 1215. The interlocked rod 122 is partially inserted into the accommodation space 1214 and has two fastening members 1221 adapted for clasping the two end of the interlocked shaft 1233.

In the improved disk retrieving and releasing device 1, the two interlocked rods 122 are connected to the interlocked device, with the intention that, the interlocked device 4 is capable of propelling the two interlocked rods 122 to drive the two interlocked shafts 1233, then the two clamping members 123 gradually exit out of the accommodation spaces 1214 and to clip the disk 3, and consequently, by way of continuously driving the interlocked shafts 1233 through the interlocked rods 122 propelled by the interlocked device, the clamping members 123 are gradually and simultaneously moved toward the top portions 1211 and to raise the disk 3. Moreover, through the cooperation of the positioning blocks 1235 and the long apertures 1215, the moving path of the two clamping members 123 are confined when the interlocked rods 122 drives the interlocked shafts 1233.

Figure 5A:
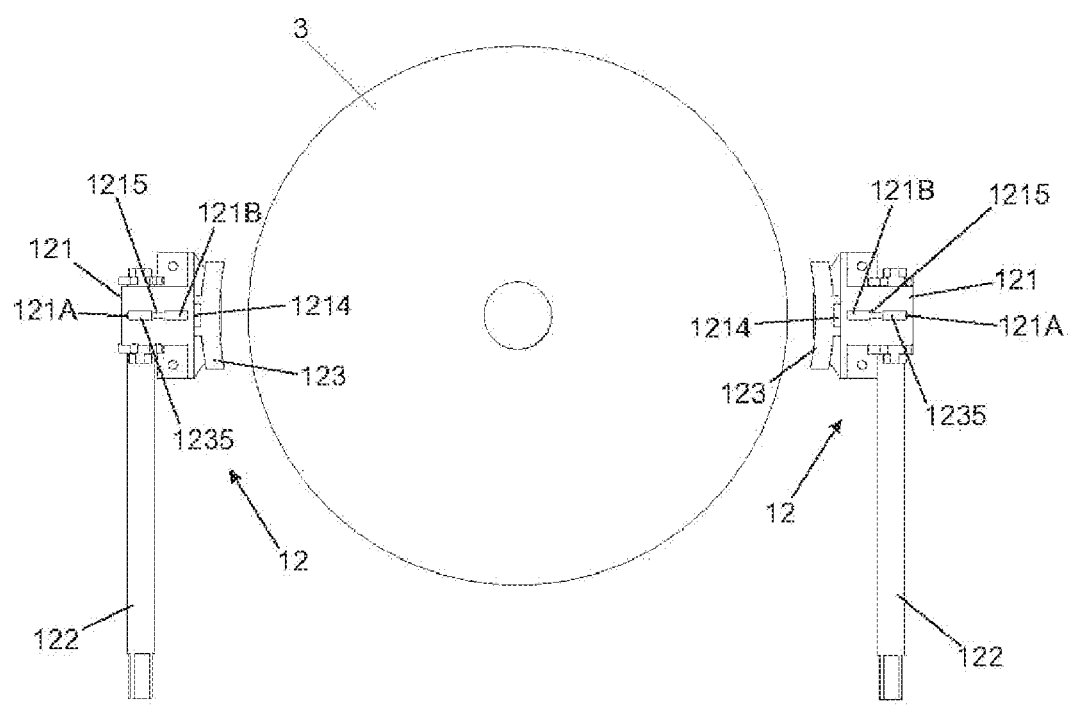
FIGS. 5A, 5B and 5C are schematic operation diagrams of using the two clamping mechanisms to clip a disk.
Figure 5B:
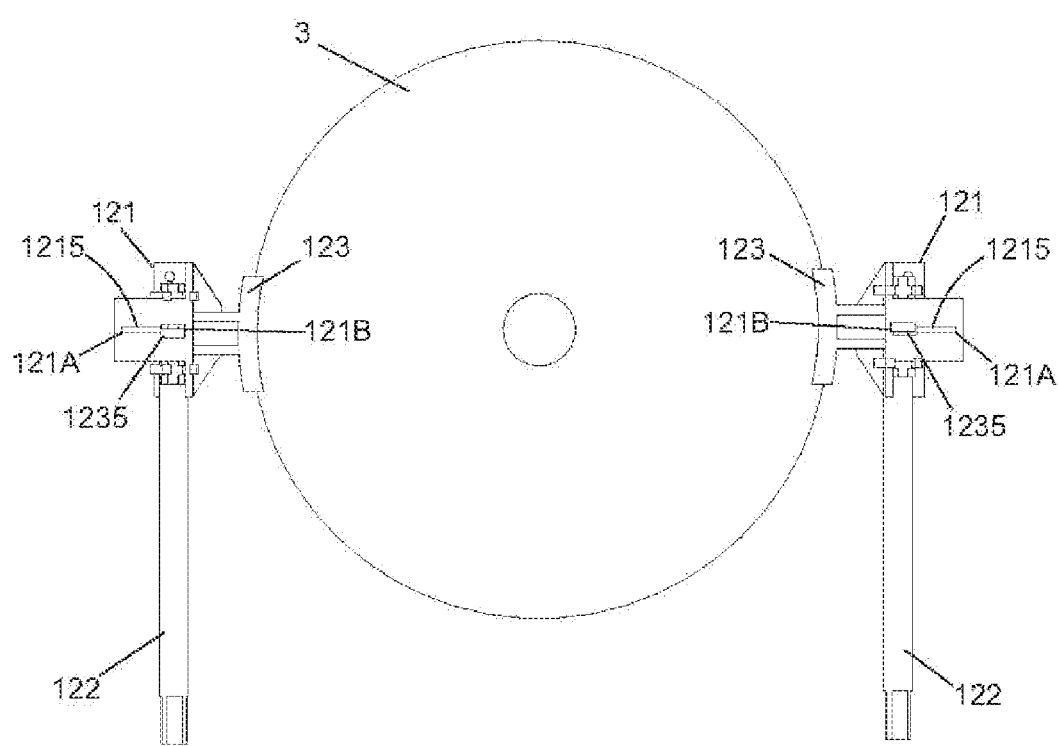
Figure 5C:
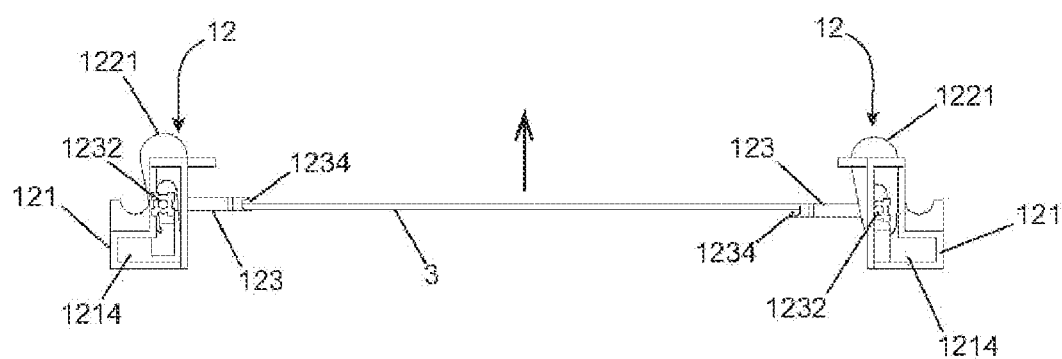

For more clearly describing the improved disk retrieving and releasing device 1 of the present invention, please refer to FIG. 4B again, and simultaneously referring to FIGS. 5A, 5B and 5C, in which schematic operation diagrams of using the two clamping mechanisms to clip the disk are illustrated. As shown in FIG. 5A, when the interlocked device is not yet to propel the clamping mechanisms 12, meanwhile, the two positioning blocks 1235 passes through the two long apertures 1215, respectively; moreover, each of positioning blocks 1235 are located at a starting position 121A of the two long apertures 1215, respectively. When the interlocked device starts to propel the interlocked rods 122 and drive the interlocked shafts 1233, as shown in FIG. 5B, the two clamping members 123 gradually exits out of the two accommodation space 1214 and the two positioning blocks 1235 move to an end position 121B of the two long apertures 1215 with the clamping members 123; in the meantime, the clamping members 123 have been completely leave the accommodation spaces and the disk 3 is embedded into the two clamping grooves 1234, such that two clamping members 123 clip the disk 3. eventually, as shown in FIG. 5C, when the interlocked device continuously propels the interlocked rods 122 to drive the interlocked shafts 1233, the two clamping members 123 are vertically moved toward the top portions 1211, therefore the disk 3 is raised by the clamping members 123 and leaves the surface of the disk tray.

Figure 6:
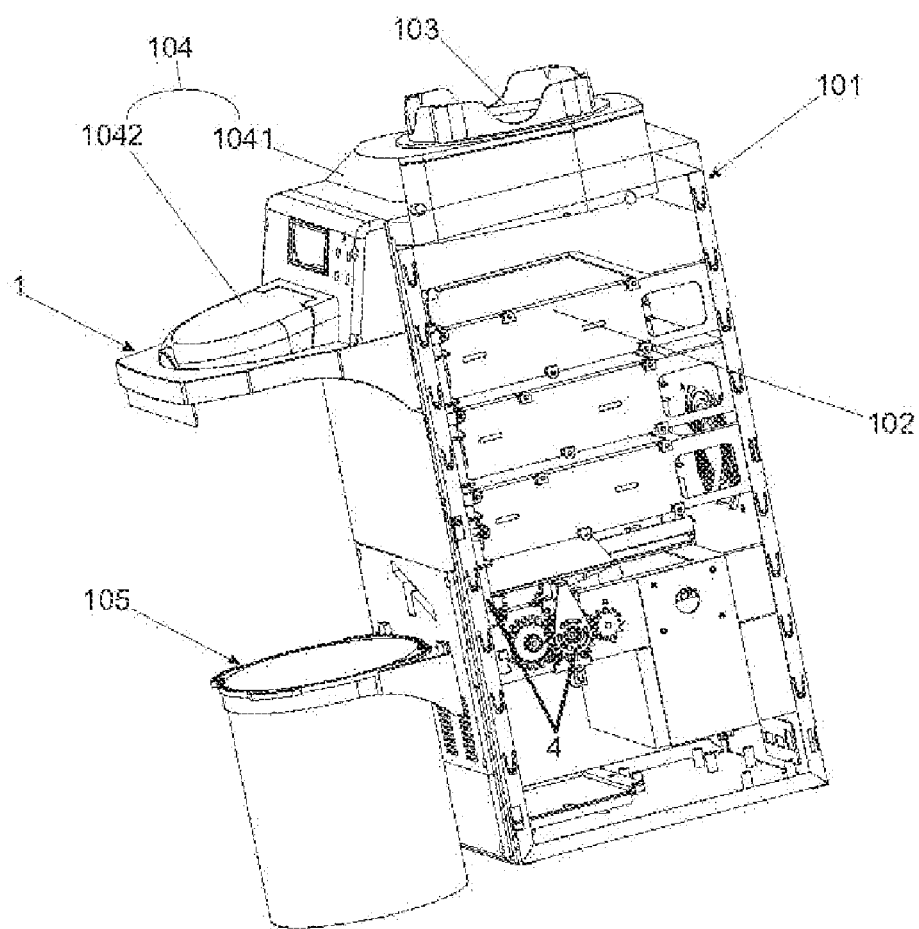
FIG. 6 is the stereo view of an automation disk burning system according to the present invention.

Thus, through the above descriptions, the components and the functionalities of the improved disk retrieving and releasing device 1 according to the present invention have been disclosed, and it is easily to know that, the improved disk retrieving and releasing device 1 can not only be disposed on the optical disk driver but also be equipped to a host with at least one optical disk driver, so as to form an automation disk burning system with the host. With reference to FIG. 6, the stereo view of an automation disk burning system according to the present invention is illustrated. As shown in FIG. 6, the automation disk burning system 10 includes: a host 101, an optical disk driver 102, an unprocessed disk storing district 103, an automation disk feeding device 104, an improved disk retrieving and releasing device 1, an interlocked device 4, and a processed disk storing district 105.

As shown in FIG. 6, the optical disk driver 102 is installed in the host 101; the automation disk feeding device 104 is equipped on the top of the host 101; the unprocessed disk storing district 103 is equipped on the top of the host 101 and connected to the automation disk feeding device 104; the improved disk retrieving and releasing device 1 is opposite to the optical disk driver 102 and attached to a front panel 1011 of the host 102; the interlocked device 4 is equipped in the host 101 and connected to the improved disk retrieving and releasing device 1; and the processed disk storing district 105 is fastened to the front panel 1011 and located below the improved disk retrieving and releasing device 1. The automation disk feeding device 104 includes a disk-feeding portion 1041 and a disk-exiting portion 1042, wherein the disk-feeding portion 1041 is connected to the unprocessed disk storing district 103, so that, through the disk-exiting portion 1042, the disk-feeding portion 1041 is able to automatically feed a disk in the unprocessed disk storing district 103 onto a disk tray of the optical disk driver 102. Besides, the components and the functionalities of the improved disk retrieving and releasing device 1 have been disclosed above, therefore, it can refer FIGS. 2A to 5C to review the components and the functionalities of the improved disk retrieving and releasing device 1.

When the automation disk burning system 10 is used to write data into the disk, the automation disk burning system 10 executes an automation disk burning process consisting of the process steps as follows:

Firstly, the disk-feeding portion 1041 automatically feeds the disk in the unprocessed disk storing district 103 onto the disk tray of the optical disk driver 102 through the disk-exiting portion 1042; Then, the disk tray gets back to the optical disk driver 102, and the optical disk driver 102 start to write the data into the disk. After the optical disk driver 102 finishes writing the data into the disk, please simultaneously refer to FIGS. 5A to 5C, the disk tray exits out of the optical disk driver 102, and the interlocked device 4 automatically propels the interlocked rods 122 to drive the interlocked shaft 1233, such that the two clamping members 123 gradually leave the accommodation spaces 1214 and to clip the disk 3; Furthermore, by way of continuously driving the interlocked shafts 1233 by the interlocked rods 122 via the interlocked device 4, the two clamping members 123 are vertically moved toward the top portions 1211, therefore the disk 3 is raised by the clamping members 123 and leaves the surface of the disk tray. After the disk 3 is raised, the disk tray returns into the optical disk driver 102; Then, the interlocked driver 4 executes a reverse operation, so as to make the clamping members 123 gradually get away from the top portions 1211 and return into the accommodation spaces 1214, therefore the two clamping members 123 release the disk 3 and the disk 3 fall into the processed disk storing district 105 (i.e., a pudding barrel shown in FIG. 6), so that the automation disk burning process is completed.

Figure 7:
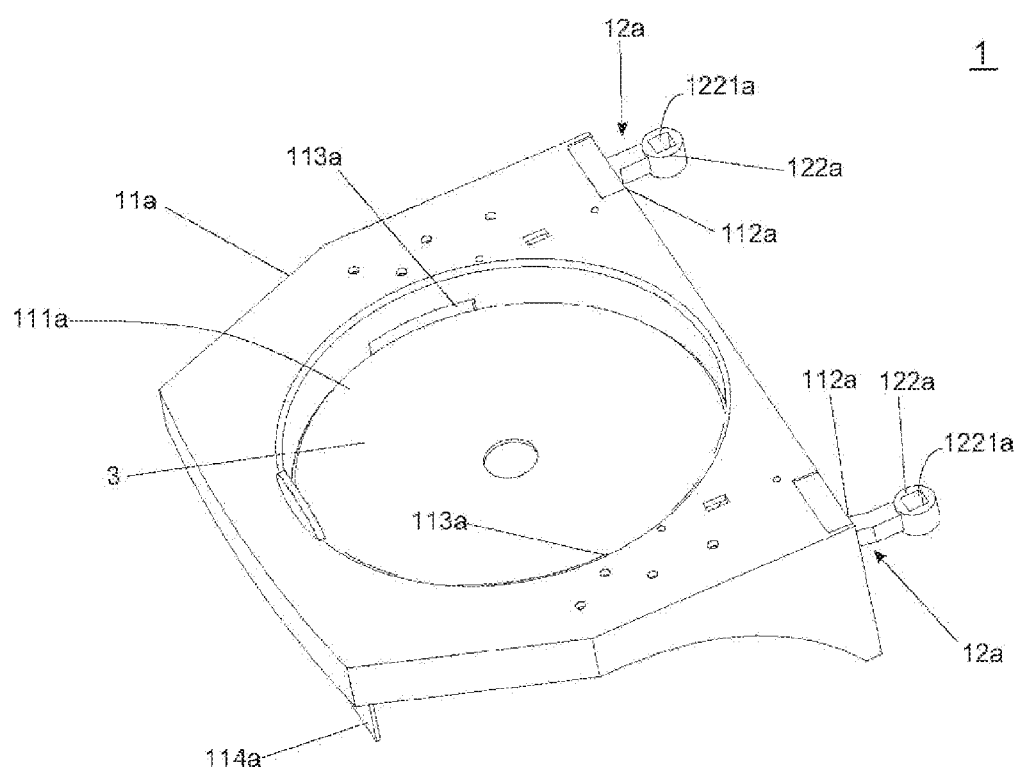
FIG. 7 is the stereo view of a second embodiment of the improved disk retrieving and releasing device according to the present invention.

Moreover, the improved disk retrieving and releasing device further has a second embodiment. Please refer to FIG. 7, which illustrates the stereo view of the second embodiment of the improved disk retrieving and releasing device according to the present invention. As shown in FIG. 7, the second embodiment of the improved disk retrieving and releasing device 1 includes: a frame body 11a, two clamping mechanisms 12a and a blocking board 114a. The frame body 11a has an opening 111a, two through holes 112a and two long recesses 113a, wherein the size of the opening 111a allows the disk 3 to pass through, the two through holes 112a are formed in the two sides of the bottom of the frame body 11a, and the two long recesses 113a are formed in the two sides of the opening 111a.

The two clamping mechanisms 12a are oppositely disposed in the two sides of the frame body 11a and adapted for connecting to an external interlocked device 4. The clamping mechanisms 12a are able to clip the disk 3 through the drive of the interlocked device 4. The blocking board 114a is opposite to the disk tray of the optical driver and disposed on one side of the frame body 11a, in the second embodiment, the blocking board 114a is used for avoiding the disk tray from falling off when the disk tray exits out of the optical disk driver.

Figure 8:
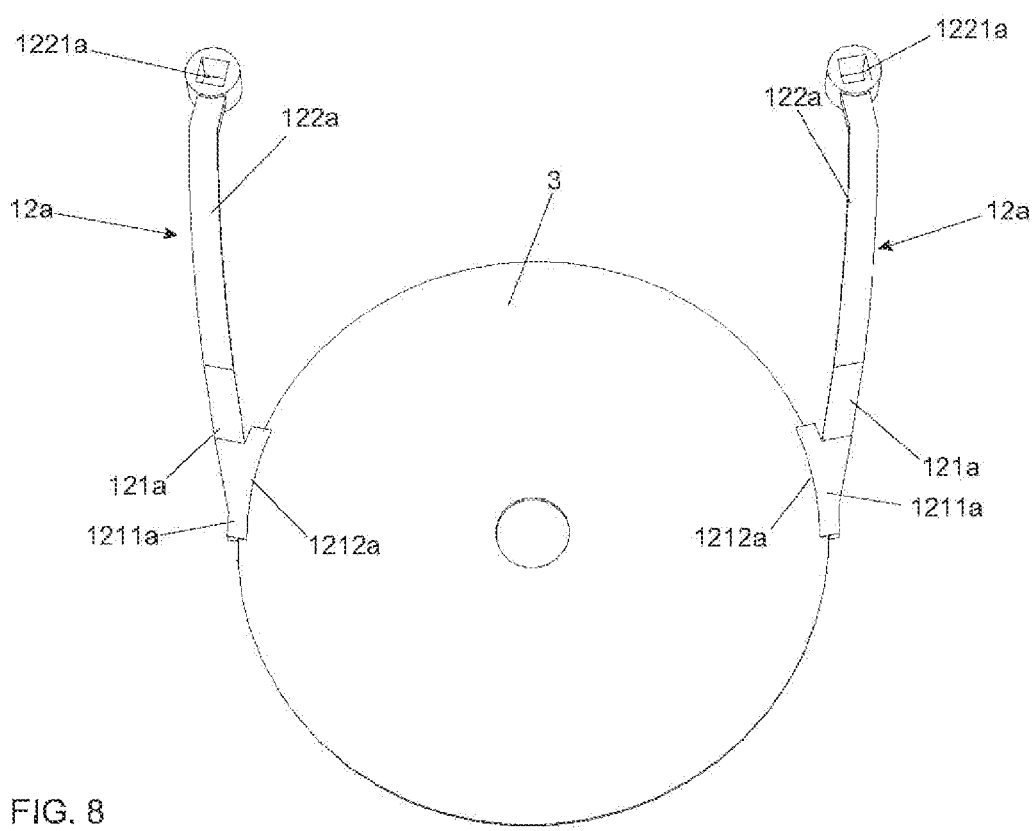
FIG. 8 is the schematic diagram of using the two clamping mechanisms to clip the disk.

Referring to FIG. 7 again, and simultaneously referring to FIG. 8, which illustrates the schematic diagram of using the two clamping mechanisms to clip the disk. As shown in FIG. 7 and FIG. 8, each of the clamping mechanisms includes: a clamping member 121a and a supporting member 122a, wherein the clamping member 121a has a clamping portion 1211a with a clamping groove 1212a, the clamping groove 1212a has a certain width for embedded the disk 3, such that the disk 3 is clipped by the two clamping portions 1211a.

The supporting member 122a is connected to the clamping member 121a, in the second embodiment, the supporting member 122a is inserted into the through hole 112a and the clamping portion 1211a is allowed to pass through the long recess 113a. Moreover, the two supporting members 122a are used for connect the interlocked device 4, such that the interlocked device 4 is capable of propelling the supporting members 122a to move, so as to make the clamping members 121a to clip the disk 3; moreover, the interlocked device 4 can further drive the supporting members 122a, and then the disk 3 is raised by the clamping members 121a and leaves the surface of the disk tray.

Figure 9:
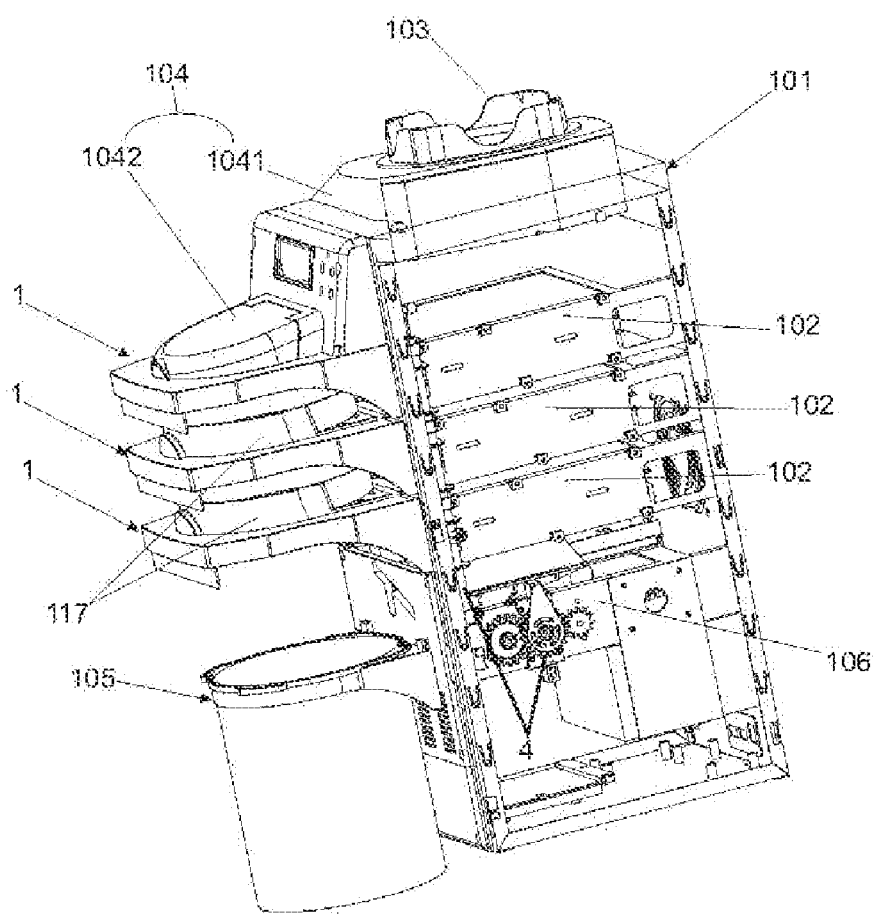
FIG. 9 is the stereo view of the automation disk burning system with multi improved disk retrieving and releasing devices according to the present invention.

Besides, please refer to FIG. 9, which illustrates the stereo view of the automation disk burning system with multi improved disk retrieving and releasing devices according to the present invention. As shown in FIG. 9, since the mechanical design and the overall structure of the improved disk retrieving and releasing device 1 is simple and fit, it allows that multi improved disk retrieving and releasing devices 1 to be equipped on the host 101 with multi optical disk drivers 102 at the same time; so that, each of the improved disk retrieving and releasing devices 1 are opposite to each of the optical disk drivers 102 for automatically clipping the disks when the disk trays exit out of the optical disk drivers 102, and releasing the disks when the disk trays return into the optical disk drivers 102. Moreover, for the automation disk burning system 10 shown in FIG. 9, it only need one interlocked device 4 to drive all the improved disk retrieving and releasing devices 1 equipped on the host 101 to clip/release the disks.

In addition, it is necessary to note that, for the automation disk burning system 10 shown in FIG. 9, the design of the improved disk retrieving and releasing device 1 is adopted the second embodiment thereof. Moreover, all improve disk retrieving and releasing devices 1 must to be installed a guiding board 117 on the frame body 11 thereof except the improve disk retrieving and releasing device 1 located in the most top position; such that, through the disk-feeding portion 1041 and the disk-exiting portion 1042, the disks 3 in the unprocessed disk storing district 103 can be smoothly and successfully fed onto the disk trays of the optical disk drivers 102 below the optical disk driver 102 located in the most top position.

Figure 10:
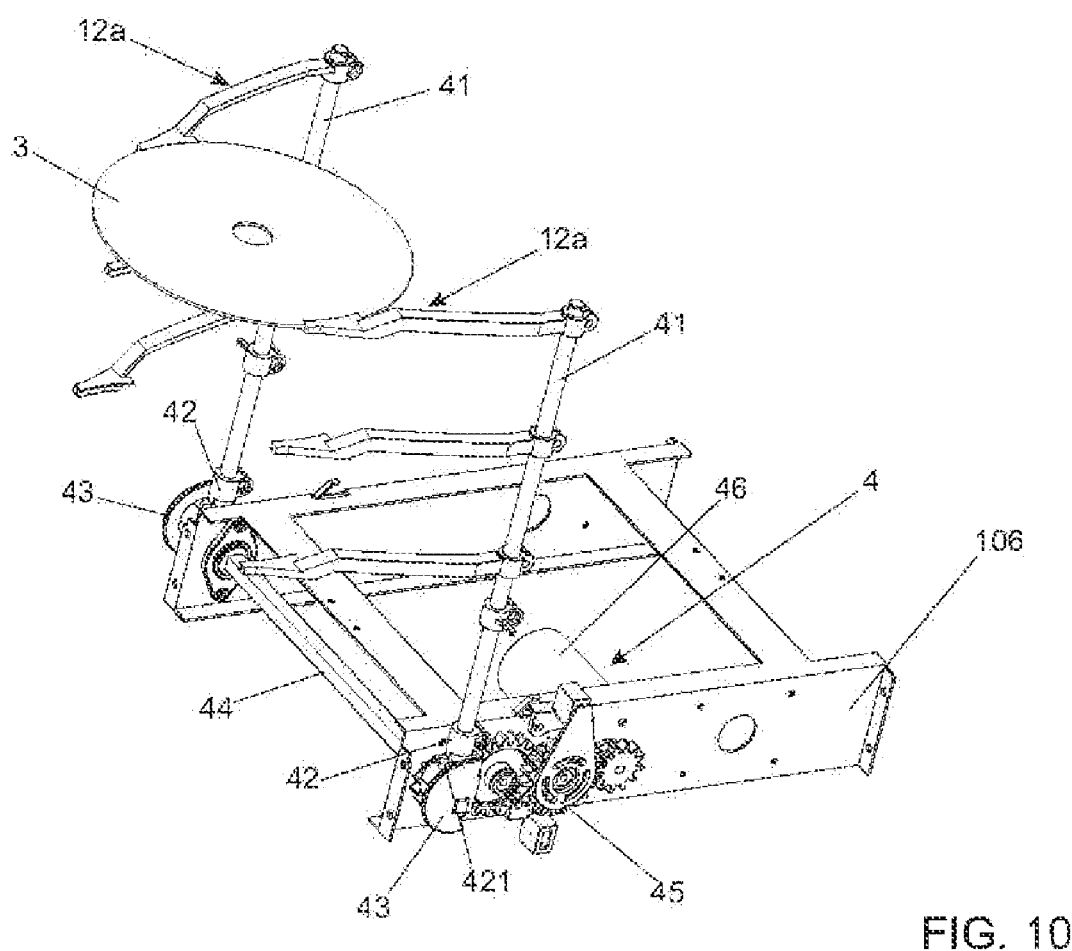
FIG. 10 is the stereo view of an interlocked device of the automation disk burning system according to the present invention.

Please refer to FIG. 10, the stereo view of an interlocked device of the automation disk burning system according to the present invention is illustrated. As shown in FIG. 10, the interlocked device 4 of the automation disk burning system includes: two interlocked pillars 41, two sliding members 42, two interlocked wheels 43, a coaxial shaft 44, a gear set 45, and a motor 46. The two interlocked pillars 41 are connected to the two supporting members 122a by way of inserting into the interlocked device connecting holes 1221a thereof, respectively. Thus, when the two interlocked pillars 41 are propelled to turn an angle, the two clamping mechanisms 12a are drove to clip or release the disk 3. The two sliding members 42 are respectively disposed on the bottom ends of the interlocked pillars 41, and each of sliding members 42 has a protrusion member 421.

The two interlocked wheels 43 are oppositely disposed on a frame 106 within the host 101, and each of the interlocked wheels 43 includes: an outer wheel 431 and an inner wheel 432 with a coaxial hole 4321, wherein the sliding member 42 can slid on an outer wall 4322 of the inner wheel 432. The coaxial shaft 44 is connected to the two interlocked wheels 43 by way of inserting into the two coaxial holes 4321. The gear set 45 is connected to one of the interlocked wheels 43. The motor 46 is connected to the gear set 45, such that the gear set 45 is able to rotate and drive the two interlocked wheels 43 to rotate when the motor 46 operates.

Figure 11A:
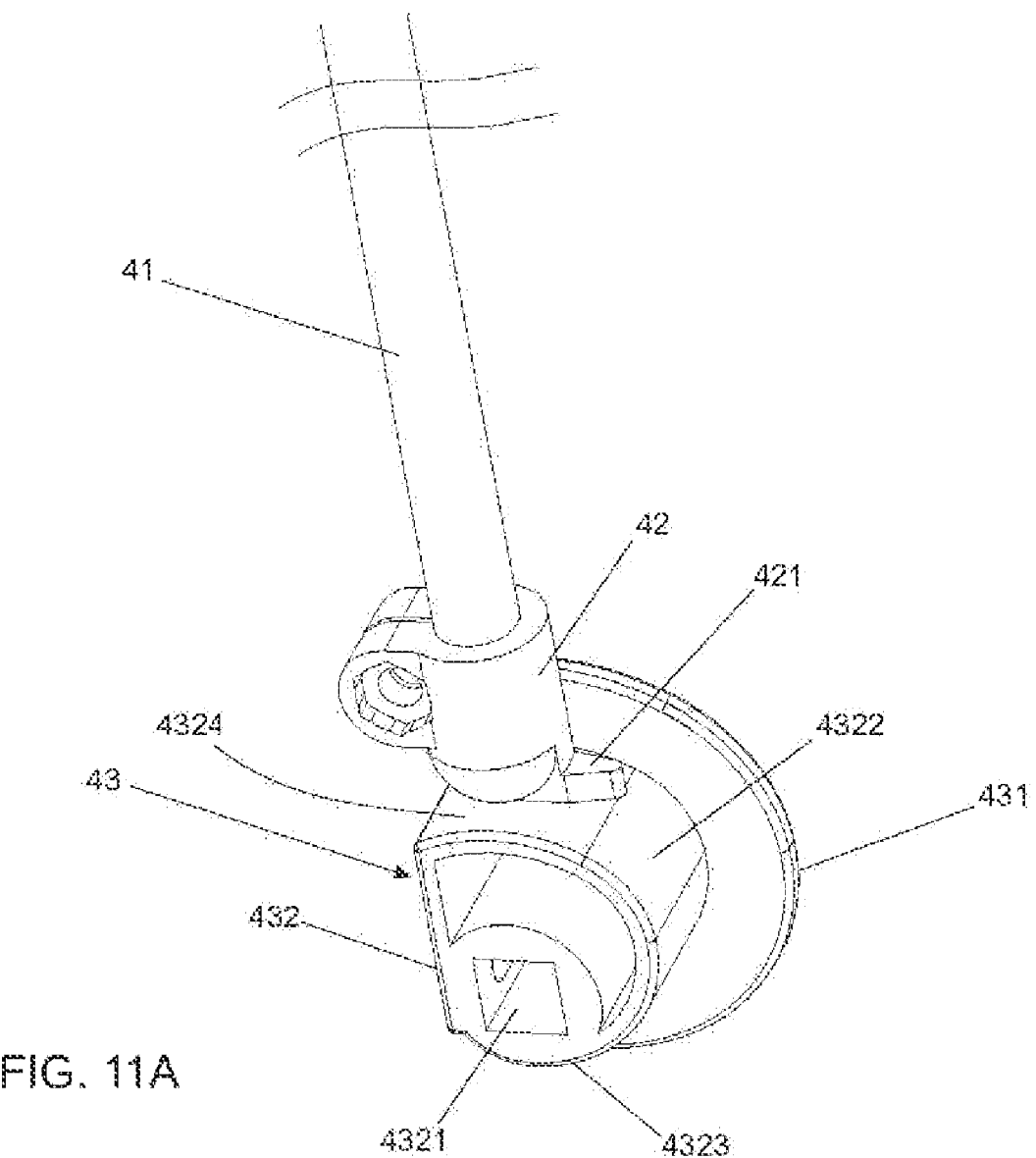
FIGS. 11A and 11B are operational schematic diagram of an interlocked wheel and a sliding member of the interlocked device.
Figure 11B:
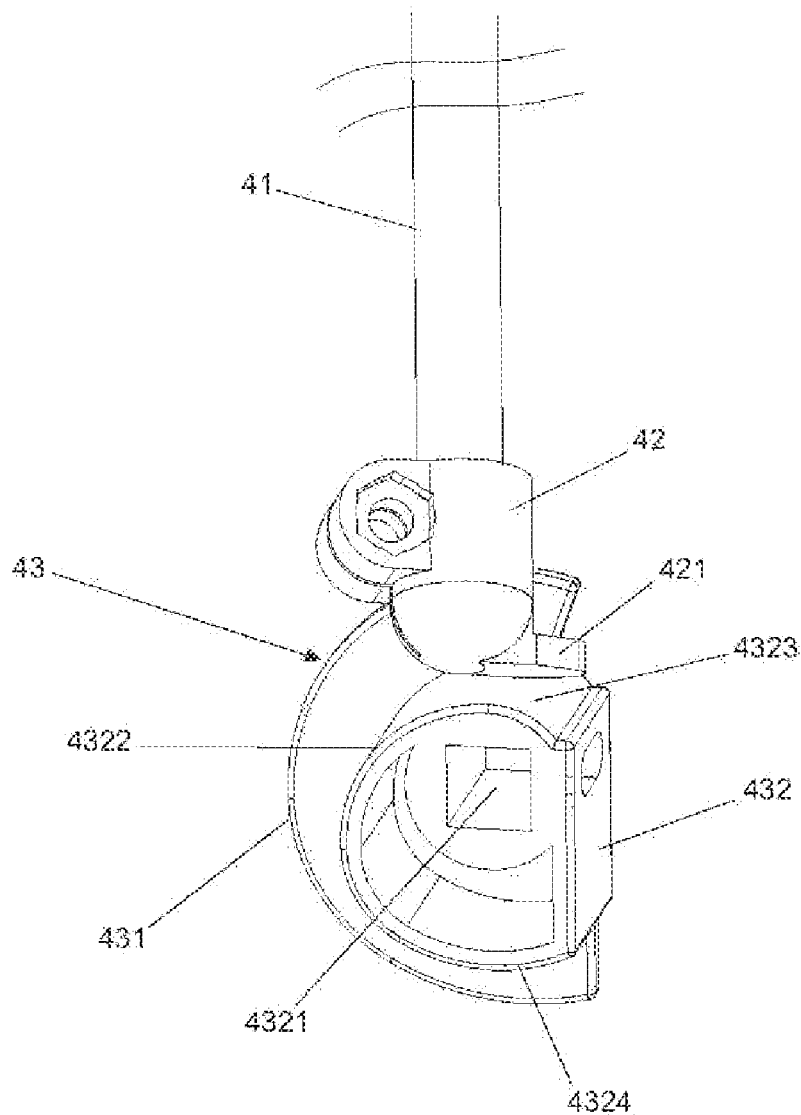

Referring to FIG. 10 again, and simultaneously referring to FIGS. 11A and 11B, which illustrate operational schematic diagram of the interlocked wheel and the sliding member of the interlocked device. As shown in FIGS. 11A and 11B, the outer wall 4322 of the inner wheel 432 has a relative low point 4323 and a relative high point 4324, wherein the relative low point 4323 and the relative high point 4324 are used for positioning the sliding member 42 when the sliding member 42 slides on the outer wall 4322. As shown in FIG. 11A, when the motor forwardly, through the drive of the gear set 45, the two interlocked wheels 43 forwardly rotate and the sliding members 42 slid on the outer walls 4322. It must be especially noted that, when the sliding members 42 start to slid, the protrusion portions 421 are force to get into the inner wall of the outer wheel 431 and turn an angle; meanwhile, the two interlocked pillars turn an angle with the sliding members 42, such that the two clamping mechanisms 12a clip the disk 3 through the drive of the interlocked pillars. Consecutively, when the sliding members 42 slid to the relative high points 4324 on the outer walls 4322, the two interlocked pillars 41 are lifted.

As shown in FIG. 11B, when the motor 46 reversely operates, the two interlocked wheels 43 are drove to reversely rotate and the sliding members 42 slid to the relative low points 4323 on the outer walls 4322, in the meantime, the two interlocked pillars 41 are put down and get back to an original height thereof; moreover, the protrusion portions 421 get out of the inner wall of the outer wheel 431 and return to an original angle thereof, so that the interlocked pillars 41 are drove by the sliding members 42 and get back to an original angle thereof, so as to make the two clamping mechanisms 12a release the disk 3, and then the disk 3 falls into the processed disk storing district 105 (i.e., the pudding barrel). Thus, according to the above description, the structure, components and functionality of the interlocked device 4 have been disclosed, however, for current industrial technology, there still has variety of interlocked devices can be applied into the automation disk burning system.

Thus, the improved disk retrieving and releasing device and the automation disk burning system according to the present invention have been disclosed completely and clearly by the above description. In summary, the present invention has the following advantages:

1. The mechanical design and overall structure of the improved disk retrieving and releasing device is simple and fit, moreover, the manufacturing cost of the improved disk retrieving and releasing device is lower than the manufacturing cost of conventional the robot arm.

2. Inheriting the above point 1, for the simple mechanical design and the fit overall structure, it allows that multi improved disk retrieving and releasing devices to be equipped on one host with multi optical disk drivers, and each of the improved disk retrieving and releasing devices are opposite to each of the optical disk drivers for automatically clipping/releasing the disks.

3. The improved disk retrieving and releasing devices of the automation disk burning system are attached to the front panel of the host but not disposed in an outer side of the host, so that, the automation disk burning system will not take up too much using space.

The above description is made on embodiments of the present invention. However, the embodiments are not intended to limit scope of the present invention, and all equivalent implementations or alterations within the spirit of the present invention still fall within the scope of the present invention.

We claim:

1. An improved disk retrieving and releasing device, capable of being disposed on an optical disk driver for automatically clipping a disk when a disk tray exits out of the optical disk driver, and able to automatically release the disk into a processed disk storing district after the disk tray gets back into the optical disk driver, the improved disk retrieving and releasing device comprising:
    a frame body, having an opening with a certain size allowing the disk to pass through; and
    at least two clamping mechanisms, being oppositely disposed in the two sides of the frame body and connecting to an external interlocked device, the clamping mechanisms being able to clip the disk through the drive of the interlocked device, and each clamping mechanism comprising:
    a supporting member, having a top portion and a bottom portion with an accommodation space;
    a clamping member, being disposed in the accommodation space and having a clamping portion, an extension portion and an interlocked shaft; and
    an interlocked rod, being partially inserted into the accommodation space, and having at least one fastening member adapted for clasping the clamping member, so as to drive the clamping member;
    wherein the interlocked rods are connected to the interlocked device, with the intention that, the interlocked device being capable of propelling the interlocked rods to drive the interlocked shafts, then the clamping members gradually exit out of the accommodation space and clip the disk, and consequently, the clamping members being gradually and simultaneously moved toward the top portions and to raise the disk by way of continuously driving the interlocked shafts through the interlocked rods propelled by the interlocked device.

2. The improved disk retrieving and releasing device of claim 1, further comprising a blocking board, being opposite to the disk tray of the optical driver and disposed on one side of the frame body, the blocking board being used for preventing the disk tray from falling off when the disk tray exits out of the optical disk driver.

3. The improved disk retrieving and releasing device of claim 1, wherein the frame body further comprises:
    at least two through holes, being formed in the two sides of the bottom of the frame body and adapted for inserting the interlocked rods;
    at least two long recesses, being formed in the two sides of the opening, wherein the size of the long recess allows the clamping portion to pass through;
    a plurality of first connecting holes, being formed on the two sides of the frame body, and being used for securing the supporting members to the two bottom sides of the frame body; and
    at least two threaded holes, being opposite to the at least two through holes and formed in the two sides of the bottom of the frame body, wherein the frame body can be attached to the optical disk driver through the threaded holes.

4. The improved disk retrieving and releasing device of claim 1, wherein the clamping portion further comprises a clamping groove with a certain width, such that the disk can be embedded in to the clamping groove.

5. The improved disk retrieving and releasing device of claim 1, wherein the supporting member further comprises at least one connecting portion connected to the top portion and the bottom portion.

6. The improved disk retrieving and releasing device of claim 1, wherein the bottom portion further comprises a long aperture.

7. The improved disk retrieving and releasing device of claim 6, wherein the clamping member further comprises a positioning block, being perpendicularly disposed on the interlocked shaft and passing through the long aperture, by way of cooperation of the positioning block and the long aperture, the moving path of the clamping member being confined when the interlocked rod drives the interlocked shaft.

8. An improved disk retrieving and releasing device, capable of being disposed on an optical disk driver for automatically clipping a disk when a disk tray exits out of the optical disk driver, and able to automatically release the disk into a processed disk storing district after the disk tray returns into the optical disk driver, the improved disk retrieving and releasing device comprising:
    a frame body, comprising an opening with a certain size allowing the disk to pass through; and
    at least two clamping mechanisms, being oppositely disposed in the two sides of the frame body and connecting to an external interlocked device, the clamping mechanisms being able to clip the disk through the drive of the interlocked device, each of the clamping mechanisms comprising:
    a clamping member, having a clamping portion adapted for clipping the disk; and
    a supporting member, being connected to the clamping member;
    wherein the frame body further comprises at least two through holes and at least two long recesses, the through holes being formed in the two sides of the bottom of the frame body and adapted for inserting the two supporting members, respectively, and the long recesses being formed in the two sides of the opening; moreover, the size of the long recess allows the clamping portion to pass through;
    wherein the supporting members are connected to the interlocked device, with the intention that, the interlocked device being capable of propelling the supporting members to move, so as to make the clamping members to clip the disk; moreover, the interlocked device can further drive the supporting members, and then the disk is raised by the clamping members and leaves the surface of the disk tray.

9. The improved disk retrieving and releasing device of claim 8, further comprising a blocking board, being opposite to the disk tray of the optical driver and disposed on one side of the frame body, the blocking board being used for avoiding the disk tray from falling off when the disk tray exits out of the optical disk driver.

10. The improved disk retrieving and releasing device of claim 8, wherein the supporting member comprises an interlocked device connecting hole adapted for connecting the interlocked device.

11. The improved disk retrieving and releasing device of claim 8, wherein the clamping portion comprises a clamping groove with a certain width, so that, by way of being embedded into the two clamping grooves, the disk can be clipped by the two clamping portions.

12. An automation disk burning system, comprising:
a host, having at least one optical disk driver;
an unprocessed disk storing district, being disposed on the host for storing a plurality of disks;
an automation disk feeding device, being disposed on the host and having a disk-feeding portion and a disk-exiting portion, wherein the disk-feeding portion is connected to the unprocessed disk storing district, so that, through the disk-exiting portion, the disk-feeding portion being able to automatically feed a disk in the unprocessed disk storing district onto a disk tray of the optical disk driver; and
at least one improved disk retrieving and releasing device, being opposite to the at least one optical disk driver and disposed on a front panel of the host, and being used to automatically clip the disk when the disk tray exits out of the optical disk driver, the improved disk retrieving and releasing device comprising:
a frame body, having an opening with a certain size allowing the disk to pass through; and
at least two clamping mechanisms, being oppositely disposed on the two sides of the frame body and connecting to an external interlocked device, so that the clamping mechanisms are able to clip the disk through the drive of the interlocked device, each of the clamping mechanisms comprising:
a clamping member, having a clamping portion adapted for clipping the disk; and
a supporting member, being connected to the clamping member;
wherein the frame body further comprises at least two through holes and at least two long recesses, the through holes being formed in the two sides of the bottom of the frame body and adapted for inserting the two supporting members, respectively, and the long recesses being formed in the two sides of the opening; moreover, the size of the long recess allows the clamping portion to pass through;
wherein the supporting members are connected to the interlocked device, with the intention that, the interlocked device being capable of propelling the supporting members to move, so as to make the clamping member to clip the disk; moreover, the interlocked device can further propel the supporting members, such that the disk is raised by the clamping members and leaves the surface of the disk tray; furthermore, after the disk tray returns into the optical disk driver, the interlocked device reversely operating and driving the supporting members, such that the clamping members are getting down and release the disk, and then the disk falls into a processed disk storing district.

13. The automation disk burning system of claim 12, wherein the clamping mechanism further comprises a blocking board, being opposite to the disk tray of the optical driver and disposed on one side of the frame body, the blocking board being used for preventing the disk tray from falling off when the disk tray exits out of the optical disk driver.

14. The automation disk burning system of claim 12, wherein the supporting member comprises an interlocked device connecting hole adapted for connecting the interlocked device.

15. The automation disk burning system of claim 12, wherein the clamping portion further comprises a clamping groove with a certain groove width, such that the disk can be embedded into the clamping groove.

16. The automation disk burning system of claim 12, wherein when multi improve disk retrieving and releasing devices are equipped on the host at the same time, all improve disk retrieving and releasing devices must to be installed a guiding board on the frame bodies thereof except the improve disk retrieving and releasing device located in the most top position.

17. The automation disk burning system of claim 12, wherein the interlocked device comprises:
two interlocked pillars, being respectively connected to the two supporting members;
two sliding members, being respectively disposed on the bottom ends of the interlocked pillars, and each of sliding members having a protrusion member;
two interlocked wheels, each of the interlocked wheels having an outer wheel and an inner wheel with a coaxial hole, wherein the sliding member can slid on an outer wall of the inner wheel;
a coaxial shaft, being connected to the two interlocked wheels by way of inserting into the two coaxial holes;
a gear set, being connected to one of the interlocked wheels; and
a motor, being connected to the gear set, such that the gear set is capable of rotating and driving the two interlocked wheels to rotate when the motor operates.

18. The automation disk burning system of claim 17, wherein the outer wall of the inner wheel comprises a relative low point and a relative high point, so that, when the motor forwardly operates, the two interlocked wheels being drove to forwardly rotate and the sliding members sliding to the relative high points on the outer walls, meanwhile, the two interlocked pillars being lifted; in addition, when the motor reversely operates, the two interlocked wheels being drove to reversely rotate and the sliding members sliding to the relative low points on the outer walls, in the meantime, the two interlocked pillars being put down and getting back to an original height thereof.

* * * * *